(12) United States Patent
Tomisawa

(10) Patent No.: US 8,688,484 B2
(45) Date of Patent: Apr. 1, 2014

(54) METHOD AND SYSTEM FOR MANAGING COMPUTER RESOURCE IN SYSTEM

(75) Inventor: Hiroyuki Tomisawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1812 days.

(21) Appl. No.: 11/377,536

(22) Filed: Mar. 17, 2006

(65) Prior Publication Data

US 2006/0210051 A1 Sep. 21, 2006

(30) Foreign Application Priority Data

Mar. 18, 2005 (JP) ................................. 2005-080022

(51) Int. Cl.
  *G06Q 10/00* (2012.01)
(52) U.S. Cl.
  USPC ............................................................ 705/5
(58) Field of Classification Search
  USPC ............................................................ 705/5
  See application file for complete search history.

(56) References Cited

U.S. PATENT DOCUMENTS

| | | | | |
|---|---|---|---|---|
| 6,400,710 B1 * | 6/2002 | Golden et al. | ................. | 370/352 |
| 2004/0059644 A1 * | 3/2004 | Blau | ................. | 705/26 |
| 2005/0216949 A1 * | 9/2005 | Candelora et al. | ............ | 725/134 |
| 2005/0273668 A1 * | 12/2005 | Manning | .......................... | 714/39 |

FOREIGN PATENT DOCUMENTS

| | | |
|---|---|---|
| JP | 2001-188684 | 7/2001 |
| JP | 2004-508616 | 3/2004 |
| JP | 2004-240671 | 8/2004 |
| JP | 2004-252975 | 9/2004 |
| WO | WO 02/03203 | 1/2002 |

OTHER PUBLICATIONS

"Web Services Distributed Management: Management of Web Services (WSDM-MOWS) 1.0", Oasis-Standard, Mar. 9, 2005, pp. 1-50.
"Web Services Distributed Management: Management Using Web Services (MUWS 1.0) Part 1" , Oasis Standard, Mar. 9, 2005. pp. 1-30.
"Web Services Distributed Management: Management Using Web Services (MUWS 1.0) Part 2", Oasis Standard, Mar. 9, 2005. pp. 1-53.
Web Services Resource 1.2 (WS-Resource), Working Draft 02, Dec. 9, 2004., pp. 1-20.
"Web Services Resource Properties 1.2 ( WS-Resource Properties)" Working Draft 05, Nov. 30, 2004., pp. 1-71.
"Web Services Agreement Specification (WS-Agreement)" by A. Andrieux, et al. pp. 1-62. Jun. 2005.

\* cited by examiner

*Primary Examiner* — John Hayes
*Assistant Examiner* — Allen J Jung
(74) *Attorney, Agent, or Firm* — Brundidge & Stanger, P.C.

(57) ABSTRACT

Disclosed is a resource management method by which one or more lender center apparatuses each lend one or more computer's resources to a borrower center apparatus, and which is executed by the borrower center apparatus. The method includes the step of receiving, from each of the lender center apparatuses, resource information on one or more resources, and registering the resource information to a management table, the step of detecting a shortage of one or more computer's resources in the borrower center apparatus, and pinpointing a bottleneck causing the shortage, the step of searching through the management table for one or some of the resources which can resolve the bottleneck, and creating a center list of one or some of the lender center apparatuses which possess the searched resources, and the step of requesting the lender center apparatuses on the center list to lend the searched resources.

12 Claims, 11 Drawing Sheets

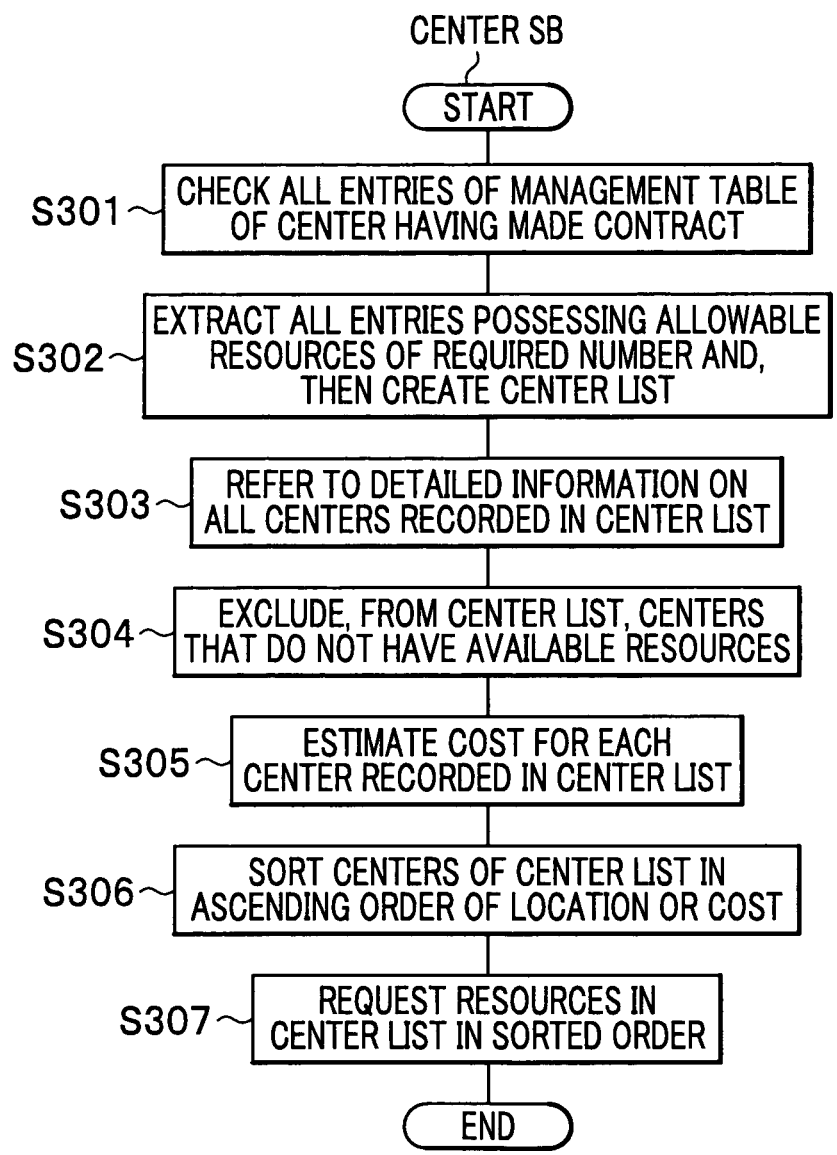

METHOD AND SYSTEM FOR MANAGING COMPUTER RESOURCE IN SYSTEM

CROSS-REFERENCE TO RELATED APPLICATIONS

This application claims the benefit of Japanese Patent Application 2005-080022 filed on Mar. 18, 2005, the disclosure of which is incorporated herein by reference.

BACKGROUND OF THE INVENTION

The present invention relates to a technique for managing resources in computers.

Nowadays, it is popular for computers to present business through the Internet, such as on-line shopping. Many service providers (for example, on-line sales companies) do not have their own computers or server systems for providing business, but they borrow them from specialized (or rental) agencies instead. Such services that lend computers for sending information through the Internet are generally called "hosting".

On the other hand, "A resource" means a computer's resource to be borrowed/lent in the hosting. Examples of such resources include hardware resources for executing application software including application specific servers, central processing units (CPUs), memories, hard disk drives (HDDs) and load balancers, as well as software resources such as application software packages.

The specifications defining web service representation of resources and web service management of resources are described in OASIS (Organization for the Advancement of Structured Information Standards) as "Management Using Web Services" and "Management Of Web Services", respectively (WSDM (Web Services Distributed Management)) [on line], [retrieval date: Feb. 15, 2005], the Internet <URL: http://docs.oasis-open.org/wsdm/2004/12/wsdm-1.0.zip>.

Hosting companies have center apparatuses (or centers) having resources, and centers provide business to users by lending these resources. To give an example, centers provide business to user-terminals by lending use web servers (that is, resources), such as presenting merchandise catalogs of on-line shopping. A center maintains a resource for each business, and executes hosting. An example of an allocation method for presenting resources to users is described in Japanese Unexamined Patent Application Publication 2004-240671 (paragraph [0013]). This publication discloses a method and system for processing distributed computer systems.

Specifications defining general modeling and access process of resources using web services are described in OASIS "WSRF (Web Services Resource Framework)", [on line], [retrieval date: Feb. 15, 2005], the Internet <URL: http://docs.oasis-open.org/wsrf/2004/11/wsrf-WS-Resource-1.2-draft-02.pdf>, or "WSRP (Web Services Resource Properties)", [on line], [retrieval date: Feb. 15, 2005], <URL: http://docs.oasis-open.org/wsrf/2004/11/wsrf-WS-ResourceProperties-1.2-draft-05.pdf>.

In a center, there is a possibility that one or more resources cannot be used, because the failure of the sources or access concentration thereon causes a business process load to exceed the maximum capacity. In this case, one or more resources that perform hosting may be lacked temporarily in a center. Therefore, conventionally, prior to the temporary shortage of a resource, a center analyses a shortage factor and, then makes a contract with another center for borrowing a backup resource.

The contract for borrowing a resource is made based on "the WS-Agreement" that defines the specifications of a contract between a resource provider and a consumer. Even when a resource is lacking, a center can avoid the suspension of business by ensuring backup resources. The WS-Agreement is described in GGF (Global grid forum) GRAAP-WG, "WS-Agreement", [on line], [retrieval date: Feb. 15, 2005], the Internet <URL: http://forge.gridforum.org/projects/graap-wg/document/WS-Agre ementSpecificationDraft.doc/en/24

SUMMARY OF THE INVENTION

However, the contract for borrowing a backup resource is made before the resources are lacked temporarily. Hence, this contract is hard and fast and is not flexible. Even if a resource is not lacking, a center must borrow a backup resource from another center and pay its rental fee. In addition, a backup resource is not used, that is, is useless during a typical hosting operation. Accordingly, this hard-and-fast contract leads to the cost increase for a center.

To overcome the above disadvantage, a center simply borrows a backup resource only when a resource is lacking. Then, a center does not have to bear a rental cost unless a center is lacking. However, the contract is typically made before a resource is lacked. Thus, even if a center finds another center that presents a smaller rental fee after making the contract, the center must borrow a backup resource for a larger fee from the center which has the contract. This also causes the cost increase.

Taking the above disadvantages into account, the present invention has been conceived. The present invention is aimed to achieve hosting method and system which both make it possible to cope with the temporary shortage of resources at low costs.

According to an aspect of the present invention, there is provided, a resource management method by which one or more lender center apparatuses each lend one or more computer's resources to a borrower center apparatus, the method being executed by the borrower center apparatus, the method comprising:

(a1) receiving, from each of the lender center apparatuses, resource information on one or more resources which are rental objects, and registering the resource information to a management table of the borrower center apparatus;

(a2) detecting a shortage of one or more computer's resources in the borrower center apparatus, and pinpointing a bottleneck causing the shortage;

(a3) searching through the management table for one or some of the resources which can resolve the bottleneck, and creating a center list of one or some of the lender center apparatuses which possess the searched resources; and (a4) requesting the lender center apparatuses on the center list to lend the searched resources.

According to another aspect of the present invention, there is provided, a resource management method by which one or more lender center apparatuses each lend one or more computer's resources to a borrower center apparatus, the method being executed by each of the lender center apparatuses, the method including:

(b1) sending, to the borrower center apparatus, resource information on one or more resources which are rental objects, and directing the borrower center apparatus to register the resource information to a management table in the borrower center apparatus, and (b2) receiving, from the borrower center apparatus, a request of borrowing one or some of the resources on the resource information, and lending the requested resources to the borrower center apparatus.

According to still another aspect of the present invention, there is provided, a resource management system comprising:

(c1) one or more lender center apparatuses; and
(c2) a borrower center apparatus, the system by which the lender center apparatuses each lend one or more computer's resources to a borrower center apparatus, each of the lender center apparatuses for sending, to the borrower center apparatus, resource information on one or more computer's resources which are rental objects, and for receiving, from the borrower center apparatus, a request of borrowing one or some of the resources on the resource information, and lending the requested resources to the borrower center-apparatus;

the borrower center apparatus for receiving, from each of the lender center apparatuses, the resource information on the resources which are the rental objects, for registering the resource information to a management table thereof, for detecting a shortage of one or more computer's resources thereof, for pinpointing a bottleneck causing the shortage, for searching through the management table for one or some of the resources which can resolve the bottleneck, for creating a center list of one or some of the lender center apparatuses which possess the searched resources, and for requesting the lender center apparatuses on the center list to lend the searched resources.

In the above-described resource management method and system of the present invention, a borrower center apparatus does not have to request one or more lender center apparatuses to borrow one or more computer's resources, before the occurrence of shortage of one or more computer's resources in the borrower center apparatus. Consequently, it is possible to provide hosting enabling of coping with a temporary shortage of one or more resources at a low cost.

Other aspects, features and advantages of the present invention will become apparent upon reading the following specification and claims when taken in conjunction with the accompanying drawings.

BRIEF DESCRIPTION OF THE DRAWING

For more complete understanding of the present invention and the advantages hereof, reference is now made to the following description taken in conjunction with the accompanying drawings wherein:

FIG. 11 is a flowchart showing a process of searching a center to which resources are to be requested.

DESCRIPTION OF THE EMBODIMENTS

A detailed description will be given below, of a system for managing resources according to one embodiment of the present invention, with reference to the accompanying drawings. First, a configuration of the system will be described with reference to FIGS. 1 to 8.

Resources are classified into real and virtual resources; the real resources actually exist in a center, and the virtual resources exhibit the contents of real resources existing in different centers. For example, referring to FIG. 1, a center SX has nine real resources RX1 to RX9, and a center SB has three real resources RB1 to RB3. Furthermore, the center SX shows the two real resources RX3 and RX6 to the center SB as virtual resources.

As described above, a behavior where a center exhibits its real resources to a different center as objects (virtual resources) is called "virtualization of resources". For example, the center SX shows the real resource (RX1, RX2 and RX3) in order to lend them to a center SA (not shown) and, further shows the real resources (RX5 and RX6) to lend them to a center SC (not shown).

The center SX shows the resource RX3 to both the centers SA and SB, but a single resource cannot be lent to two or more centers at the same time. In addition, a showed resource may have been already lent to any given center. In this case, this resource cannot be lent to other centers.

Figure 1:
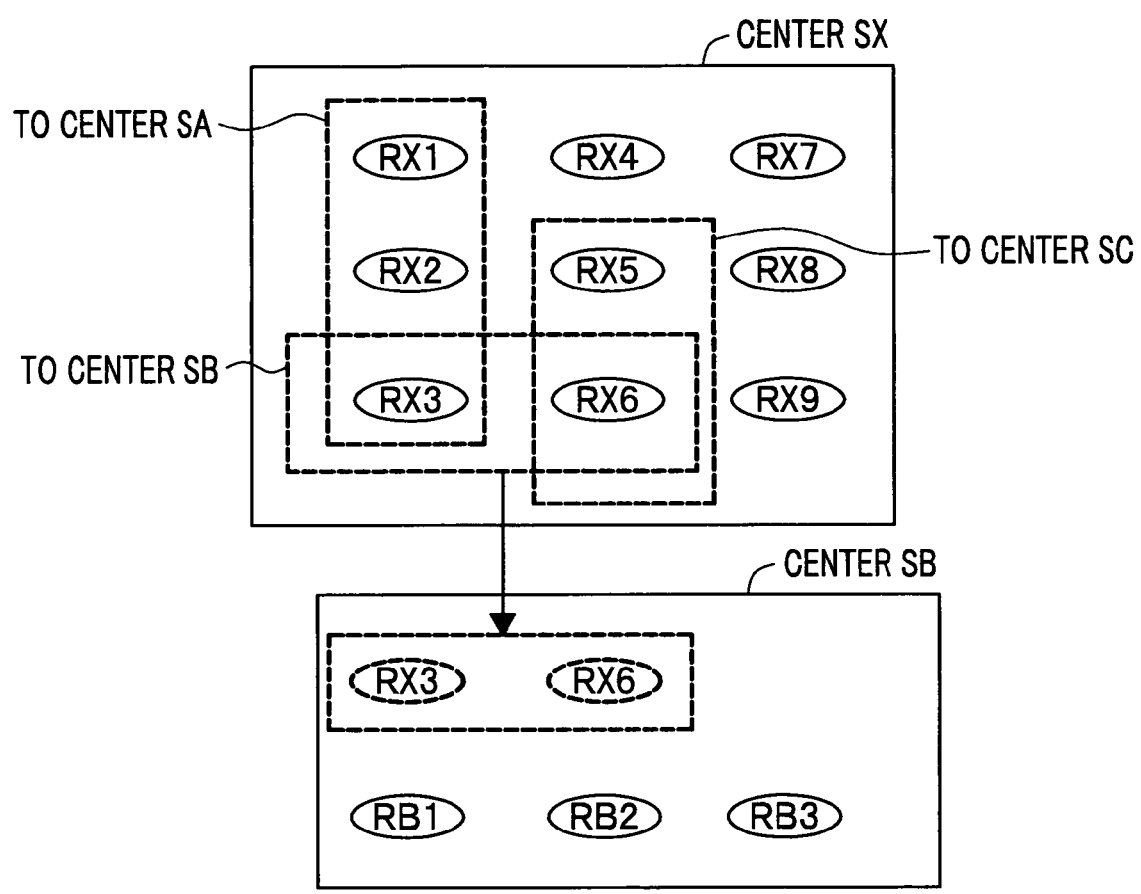
FIG. 1 is a view depicting the virtualization of resources according to an embodiment of the present invention.
Figure 2A:
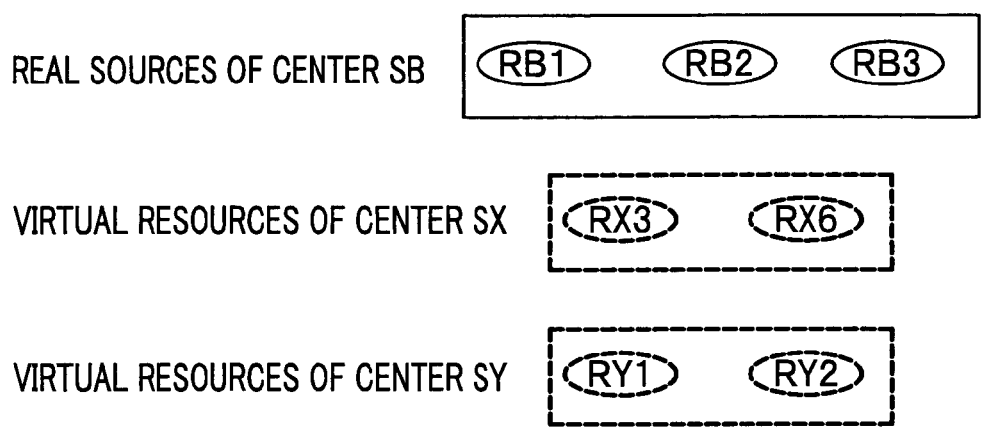
FIG. 2A is a view depicting the management of the resources.

Referring to FIG. 2A, the center SB manages the real resources RB1, RB2 and RB3, as well as the virtual resources RX3 and RX6 showed from the center SX and the virtual resources RY1 and RY2 showed from a center SY.

Figure 2B:
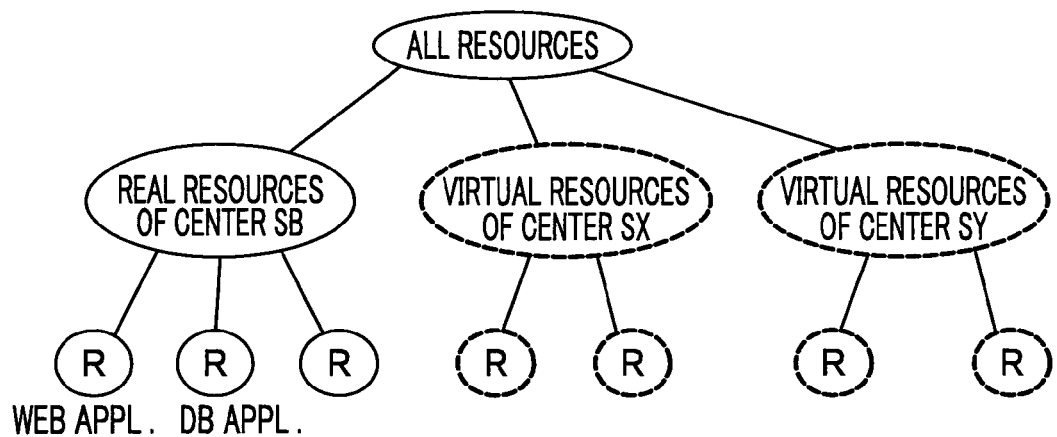
FIG. 2B is a view depicting the layered structure of management of the resources.

Referring to FIG. 2B, each of the resources is allocated to a corresponding one of the centers, and the resources in each center are separated depending their applications such as a Web or DB application.

Figure 3:
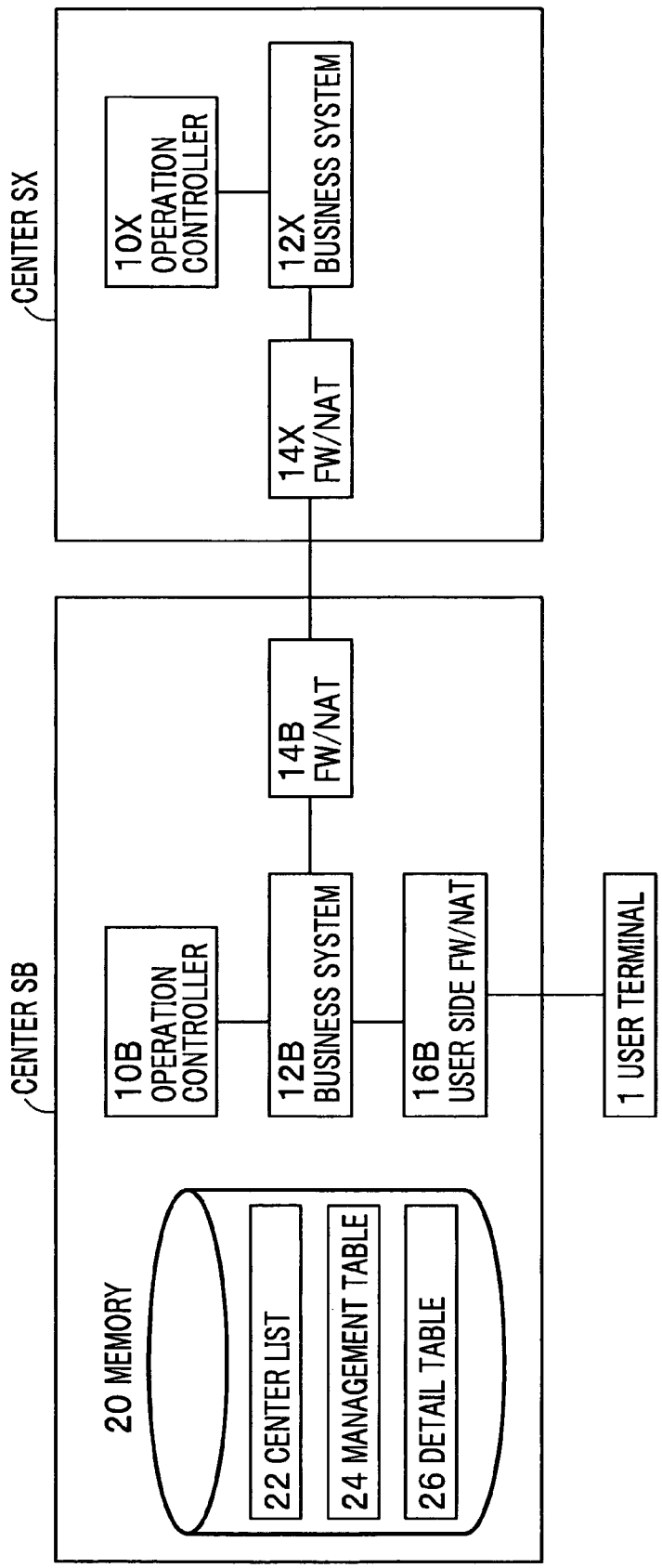
FIG. 3 is a block diagram of a resource management system according to an embodiment of the present invention.

Referring to FIG. 3, each apparatus in a resource management system is composed of a computer including a memory 20 used upon computing process and a processing unit that carries out the computing process. The memory may be a random access memory (RAM) In the computing process, the processing unit constituted by a central processing unit (CPU) runs a program stored on the memory.

The center SB (borrower center) presents a hosting service by using both its own resources and the resources borrowed from the center SX (lender center). A user-terminal 1 is used to utilize the hosting service presented by the center SX.

The center SB includes an operation controller 10B, a business system 12B, an FW/NAT 14B, a user side FW/NAT 16B and a memory 20. The center SX includes an operation controller 10X, a business system 12X and an FW/NAT 14X. The term "FW" means a firewall for blocking unauthorized intrusions through external networks, and the term "NAT" means network address translation for allowing a single global address to be shared by multiple computers.

The relation between the center SB and the center SX is a relation of lending/borrowing of the resources. Specifically, when the center SX presents a hosting service, in other words, when the center SX serves as a borrower center, the center SX has the same configuration as that of the center SB. A specific description will be given blow, of each component in a center.

In the following description, the term "deployment" means a generic name of the prearrangements that allow applications for doing business to be executable. In this case, the prearrangement includes the installment of an application, and a setting process for changing the default setting of an application or of an operating system (OS) on which an application runs into the setting suitable for predetermined business.

Figure 4A:
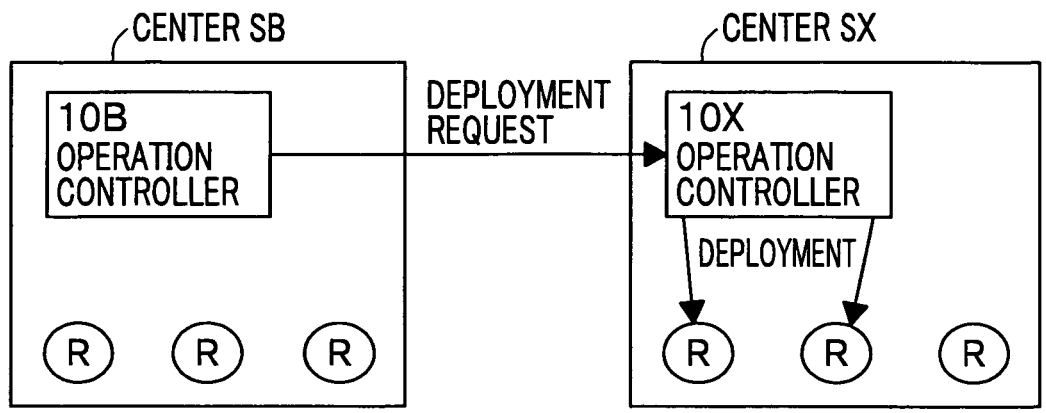
FIG. 4A is a view for explaining the deployment of the resources.

Referring to FIG. 4A, the operation controller 10B of the center SB directs the operation controller 10X of the center SX to carry out the deployment of the resources borrowed from the center SX. Upon receipt of the direction, the operation controller 10X performs the deployment of the resources that have been lent to the center SB.

Figure 4B:
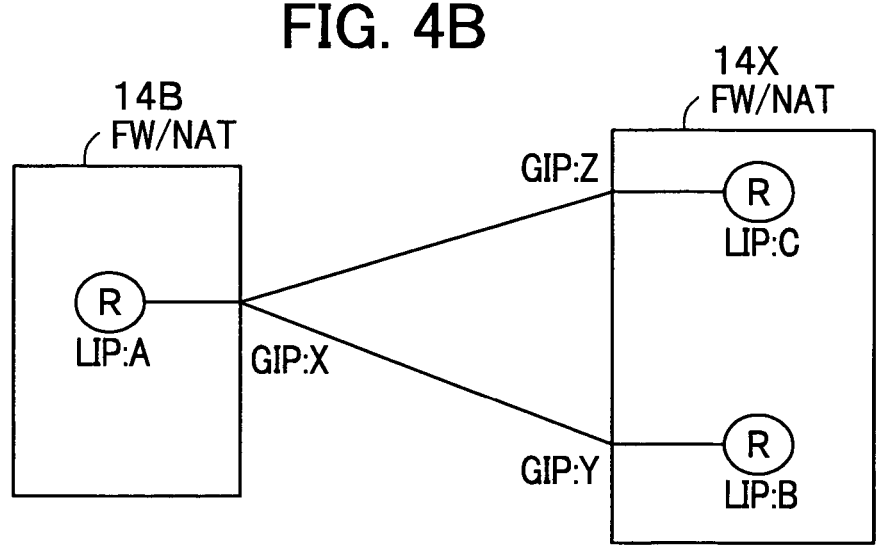
FIG. 4B is a view for explaining a process of setting a network.

Referring to FIG. 4B, the setting is performed in the FW/NAT 14B, FW/NAT 14X, and user side FW/NAT 16B. Each NAT translates a local IP address (LIP) in the center and a global IP address (GIP) used for the connection through the Internet.

The NAT may assign a global address to each resource, as shown in FIG. 4B (GIP "X"-LIP "A", GIP "Y"-LIP "B", GIP "Z"-LIP "C"). Note that GIP "X"-LIP "A" means the "X" of the global address corresponds to "A" of the local address.

The NAT may allow the number of GIPs assigned to business to be a fixed number, such as GIP "Y" & Port "Y1"-LIP "A" & Port "α", GIP "Y" & Port "Y2"-LIP "B" & Port "α", GIP "Y" & Port "Y3"-LIP "C" & Port "α". Note that [GIP "Y" & Port "Y1"-LIP "A" & Port "α"] means an entry of which global address is "Y" and port number is "Y1" corresponds to an entry of which local address is "A" and port number is "α".

In FIGS. 5A to 7, the business system is shown. Each business system means a computer environment where the hosting service business is executed.

A load balancer (LB) receives transactions and assigns them to Web servers, so that the load is distributed. Each Web server provides a user interface (UI), and it calls an application (AP) server as a common gateway interface (CGI), depending on the input of the UI. The AP server calls a data base (DB) server in order to access to data.

The AP server requests data to the DB server, for example, by sending a structured query language (SQL) massage in accordance with a simple object access protocol (SOAP). Consequently, this massage can pass through a fire wall (FW/NAT 14B or FW/NAT 14X) through the Internet.

Figure 5A:
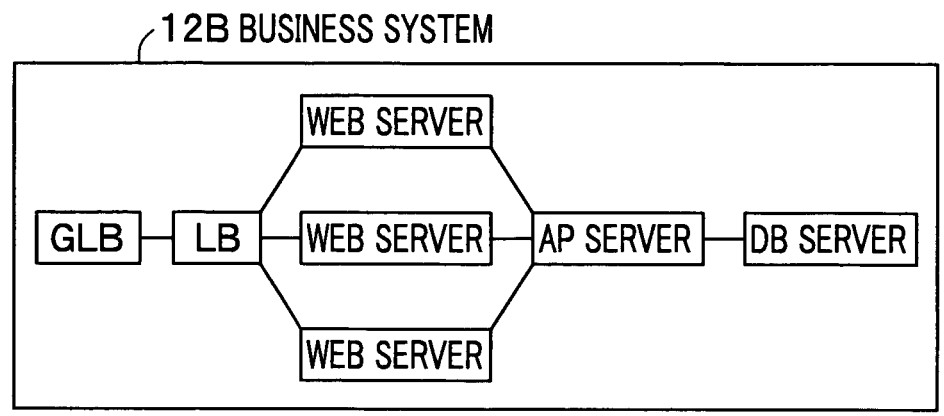
FIG. 5A is a block diagram of a business system.
Figure 5B:
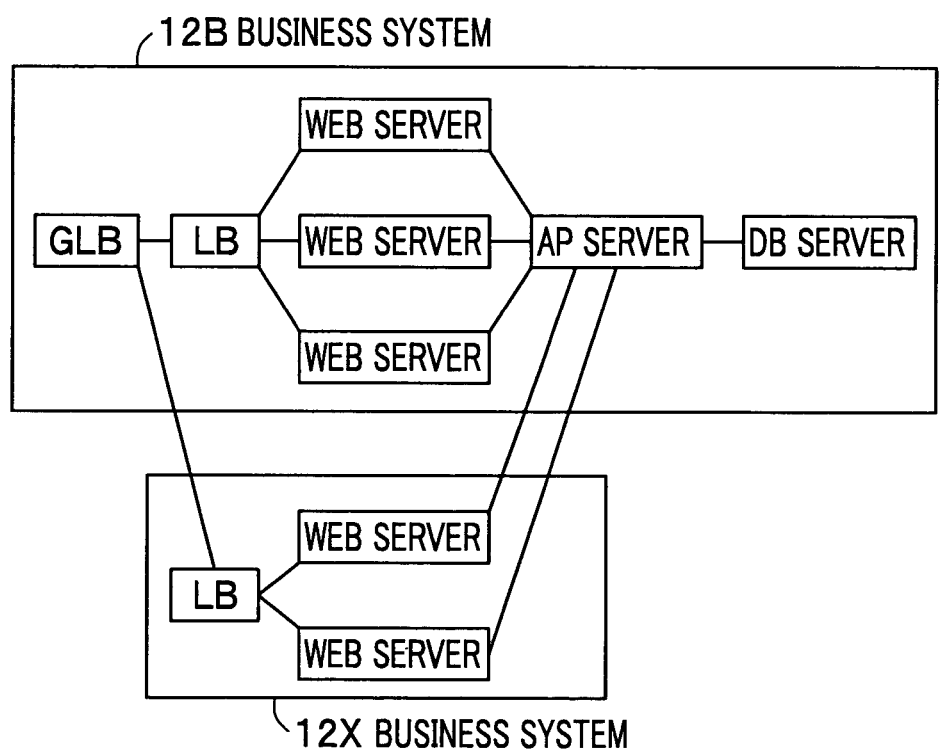
FIG. 5B is a block diagram of a business system.
Figure 6:
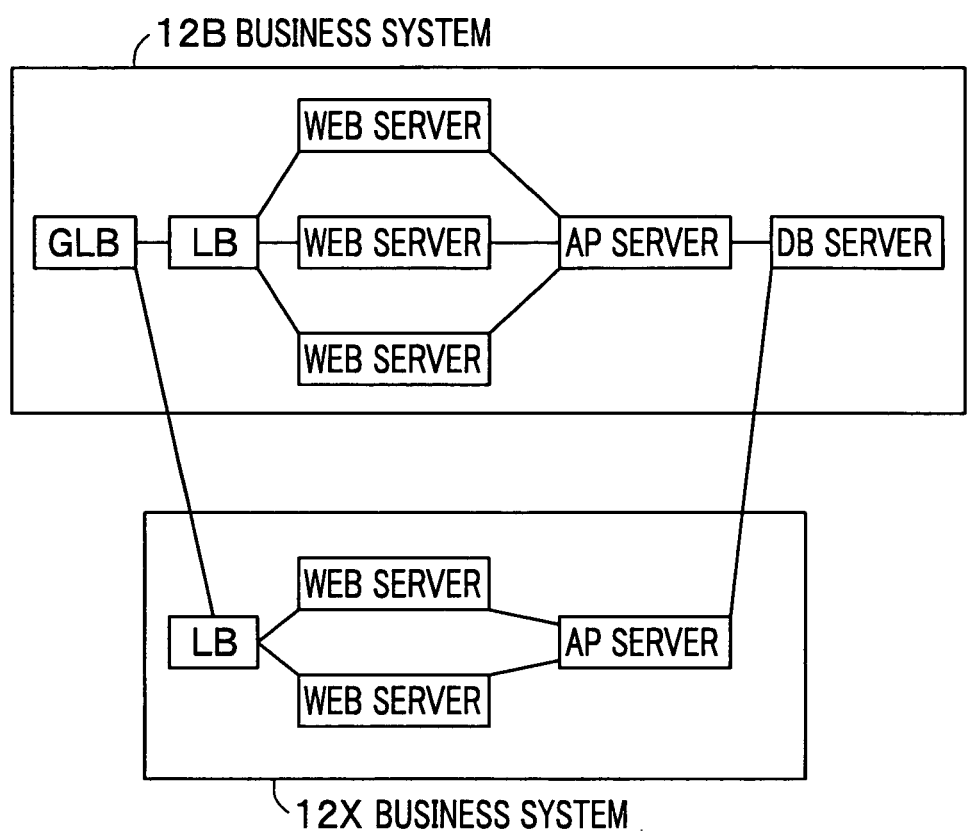
FIG. 6 is a block diagram of a business system.
Figure 7:
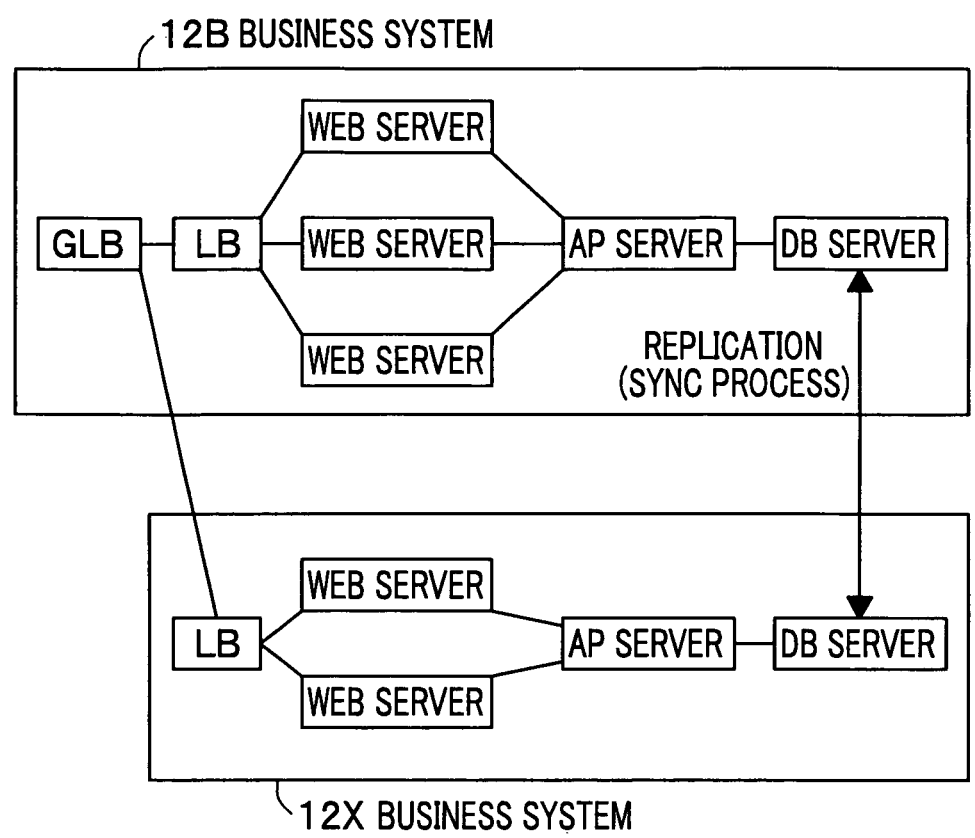
FIG. 7 is a block diagram of a business system.

Referring to FIGS. 5B, 6 and 7, every time the business system 12X borrows the resources, a global load balancer (GLB) is added to the resources. The GLB ties the multiple LBs in a bundle and assigns received transactions to the corresponding LBs As a result, the requests (or transactions) from an end user are assigned, and the processes are executed individually. Even if the transactions are assigned to the multiple centers, an end user simply acknowledge a single terminal (that is, the GLB), thus resulting in the convenience to the end user.

Now, a description will be given below, of how to determine which of the three business systems 12X of FIGS. 5B, 6, and 7 is selected. An appropriate system among the three business systems 12X is selected depending on the position of a bottleneck that may cause a temporary shortage of the resources. A bottleneck may arise in the Web server, AP server or DB server.

If a bottleneck occurs in the Web server, then a process for adding the LB and Web servers is selected, as shown in FIG. 5B. If a bottleneck occurs in the AP server, then a process for adding the LB, the Web server and the AP server is selected, as shown in FIG. 6. Moreover, if a bottleneck occurs in the DB server, then a process for adding the LB and the Web, AP and DB servers is selected, as shown in FIG. 7. In this figure, the newly added DB server replicates data of the existing DB server, and the data is thus mirrored to both DB servers.

In on-line shopping, consider an example of selecting one from the three business systems 12X depending on the position of a bottleneck. If many users browse goods on a Web server without ordering them, then the load of this Web server increases. Meanwhile, if many users put goods in their shopping carts by ordering them, then the load of the AP server or DB server increases.

Figure 8:
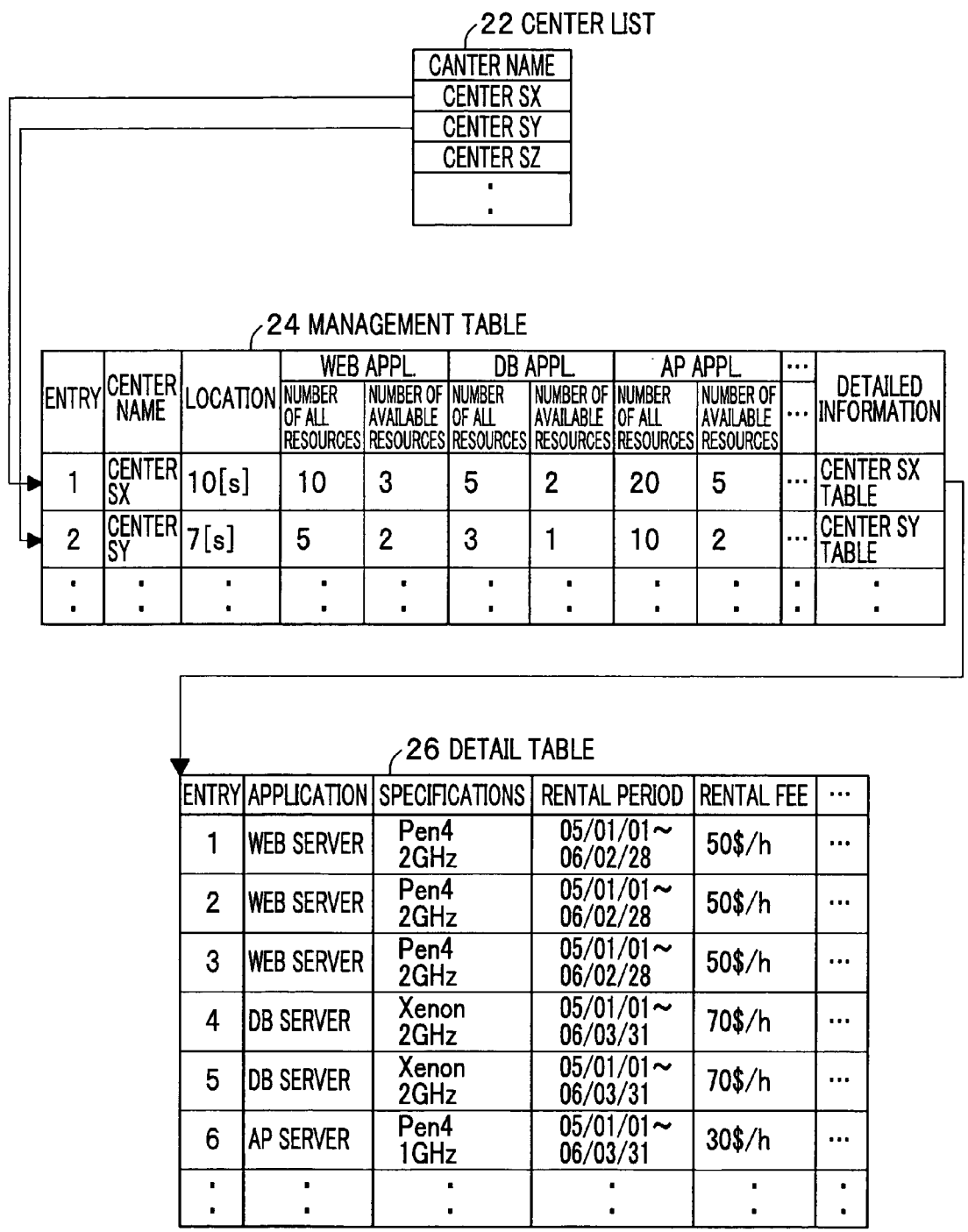
FIG. 8 is a view depicting a memory that manages the resources.

Referring to FIG. 8, a center list 22 contains all the centers from which the resources can be borrowed.

A management table 24 contains the information on one or more resources (rental objects) showed by each center. The resources are classified depending on their purpose such as a Web, DB or AP, and they make a pair with all the resources which each center has. In this table, a location indicates communication delay time between a local center (that is, a center having this table 22) and a center in each record. As the communication delay time is shorter, the center in this record is located closer to the local center.

A detail table 26 is owned by each center, and it contains detailed information on the resources showed by other centers. Each of the records is related to a corresponding one of the resources. For example, the resource of an entry 1 is used by a Web server, its specifications represent Pen 4 and 2 (GHz), its rental period ranges from May 1, 2001 to Jun. 2, 2028, and its rental fee is 50$/h.

Up to this point, the configuration of the resource management system has been described. Next, a description will be given below, of a process for registering users which is one of operations done by the resource management system, with reference to FIGS. 1 to 8 and 9 to 11.

Figure 9:
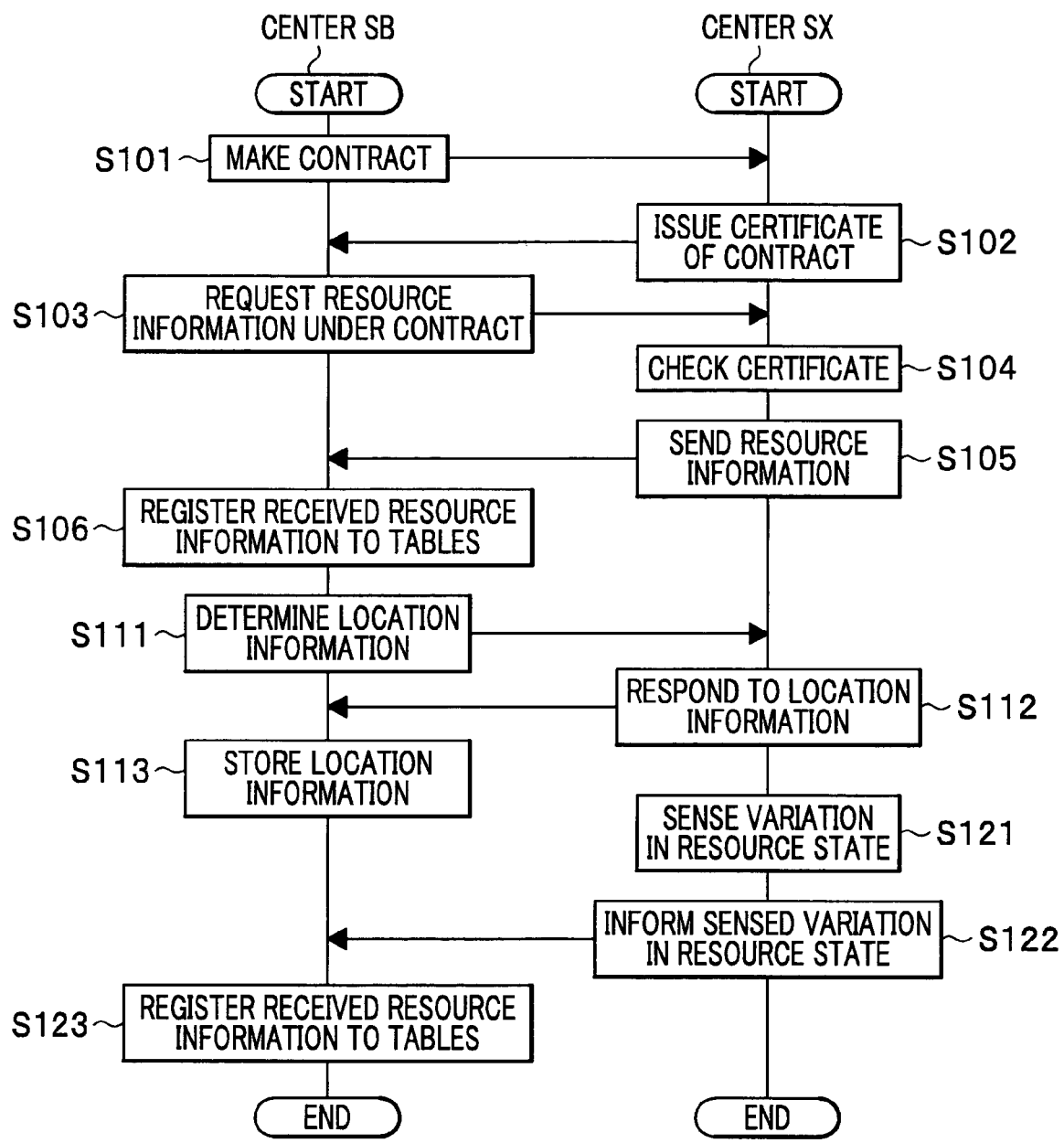
FIG. 9 is a flowchart showing a process of managing the resources.

Referring to FIG. 9, first, the center SB makes a contract with the center SX (S101). In this case, the content of the contract is not to rend/borrow the resources, but to show the information on available resources. Under this contract, the two centers communicate with each other about the available resources. Note that this contract may be made on-line through a network or off-line through a flexible disk (FD).

Next, the center SX issues, to the center SB, a certificate (electric data) showing the establishment of the contract at S101 (S102). The center SB requests the information on the resources to the center SX under the contract made at S101 (S103). This request contains another certificate of the contract. The center SX checks whether or not this certificate is the same as that issued at S102 (S104). If they are the same at S104, then the center SX sends the resource information to the center SB (S105). The center SB registers the received resource information to its management table 24 and detail table 26 (S106).

In this case, examples of the contents of the resource information that has been sent at S105 are as follows:

(1) specifications of resources;
(2) available information;
(3) rental fee;
(4) network structure such as the network owned by the resource or addresses assigned to the resources;
(5) operating record (idle period);
(6) resource supply maker;
(7) durable years; and
(8) operating years At S105, the resource information which the center SX shows does not contain all the resources that the center SX possesses. Instead, it shows one or some of the resources of the center SX to the center SB in accordance with the contract with the center SB. For example, it is assumed that the center SX makes a contract with the center SC, of which content differs from that of the contract made at S101. In this case, generally, the information which the center SX shows the center SB may differ from that which the center SX shows the center SC.

At S105, the center SX sends the information on the resource state through the interface of a Web service. This resource state varies with time. The information of the resource state may have a snapshot form, and be presented every one hour or every thirty minutes. At the time when the center SB determines to use the resource of the center SX, this resource may have been already used by another center, in other words, the information of the resource status may be old. That is why, the center SB requests the center SX to send an announcement upon reception of the information, if the resource information changes. In this way, the center SB can receive the latest resource information from the center SX whenever the resource information on the center SX changes.

Sending the resource information (S105) and registering this information in the management table 24 and the detail table 26 (S106) may be done on-line, or off-line such as direct mail. If the above procedure is done off-line, then the registration is performed by a paper (direct mail) and manpower.

Next, the center SB and the center SX determine the location information (S111). Subsequently, the center SX responds to the determined information and, then sends this response to the center SB (S112). Specifically, the location information indicates a communication delay between the local center and the partner center. The local center measures response time by accessing to an end point of the partner center. The local center measures the response time by several times and, then calculates the average of the measured values, determining this average as the location information. As the location information is shorter, the distance between the two centers on the network is shorter. Furthermore, the center SB stores the pieces of location information measured at S111 and S112 to the management table 24 (S113).

The center SX senses the variation in the state of the resources (S121). Examples of this variation include the failure of the resource and the change in the service condition of the resource. Subsequently, the center SX informs the center SB about the sensed variation in the state of the resource (S122) Following this, the center SB registers the received resource information to the tables (management table 24 and detail table 26) (S123).

Figure 10:
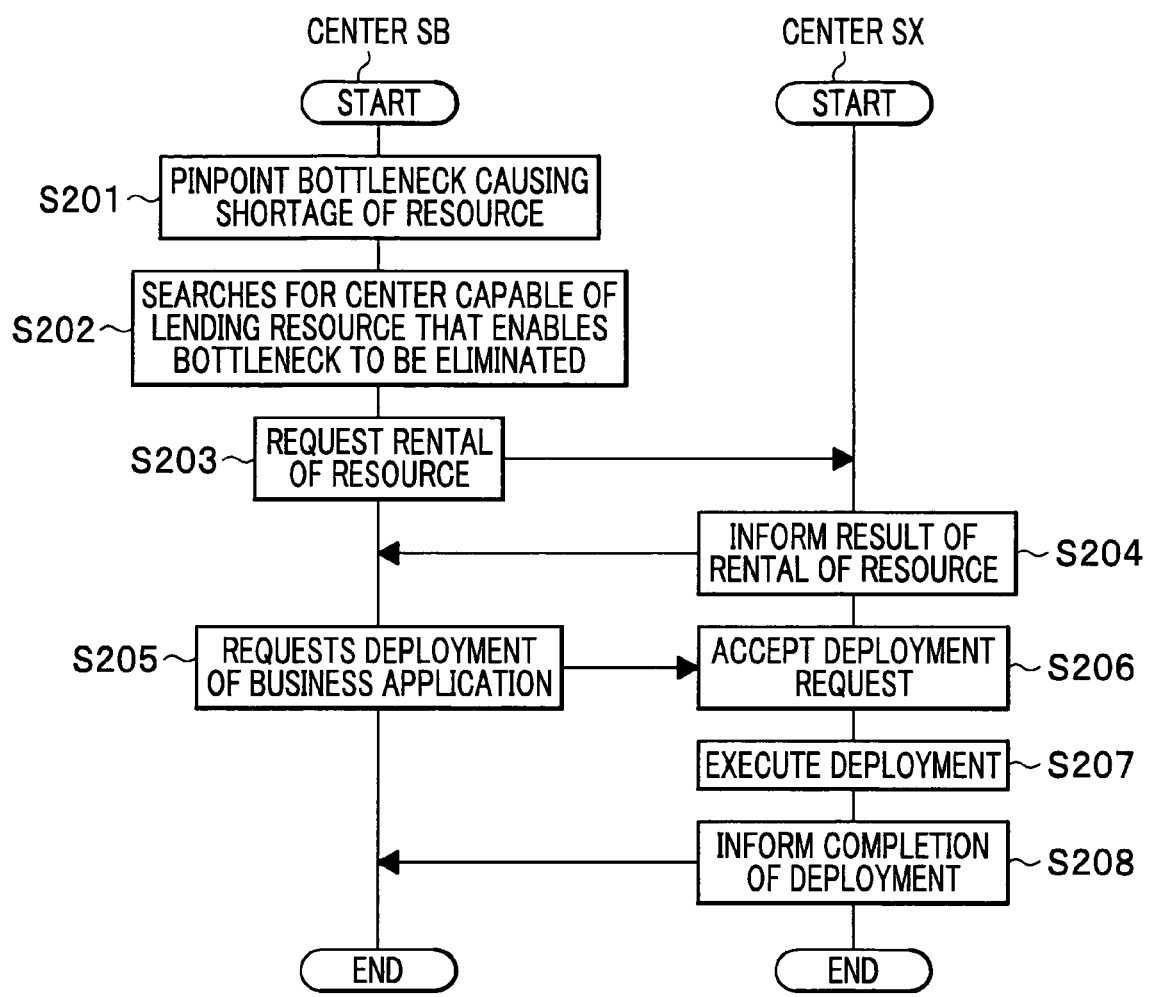
FIG. 10 is a flowchart showing a process coping with a temporary shortage of the resources.

A process of a flowchart shown in FIG. 10 is executed following the process shown in FIG. 9.

Referring to FIG. 10, first, the center SB detects whether or not there is the temporary shortage of the existing resources during the hosting operation. If the shortage is detected, the center SB pinpoints a bottleneck causing this shortage (S201). The bottleneck may be caused, for example, due to the failure of the resource, the high load of the CPU that is caused by a temporary heavy traffic, and the heavy traffic of the Web server.

Generally, the number of the transactions changes with time, and the bottleneck occurs constantly. However, if the center SB copes with all bottlenecks, then the overall cost will end up being high. Therefore, the center SB may compare all the bottlenecks and a predetermined threshold in order to select the bottlenecks to be coped with. This threshold indicates a level at which the business is difficult to continue without adding one or more resources. The threshold may be determined based on statistical data.

The center SB searches, among their own resources, for a proper resource that enables the bottleneck to be eliminated, based on the conditions of the bottleneck. If the proper resource is found, then the center SB uses this resource without lending a resource from another center. Otherwise, if a proper resource is not found within the center SB, then the center SB searches for a center capable of lending a resource that enables the bottleneck to be eliminated (S202).

Note that a detailed description will be given later, of the process for searching a proper center (S202), with reference to FIG. 11. As for this outline, the center SB acquires resource information from another center under the contract have been made at S101. Following this, the center SB compares the bottleneck and the acquired resource information. In addition, the center SB selects the most suitable resource for eliminating the bottleneck.

The center SB requests the center SX which has been found at S202 to lend the resource (S203). However, in this case, at the time when the center SB attempts to acquire the resource, this resource may not be able to be lent. Accordingly, upon search at S202, the center SB assigns priority orders to all searched centers, and creates a center list 22 used for acquiring the resource. The center SB rewrites the priority orders of the centers in the center list 22 timely, in response to the change in the resource information (S122). This makes it possible to enhance the possibility of selecting the proper resource.

Furthermore, the center SX informs the center SB about the result of lending of the resources (S204). This result is either the acceptance or rejection of lending. Upon rejection, the center SB requests a center of a next priority order within the center list 22 to borrow a resource (S203).

This is how, right after the shortage of the resource (S201), the contract of borrowing/lending a resource is made on-line (S202, S203). With this on-line contract, the shortage of the resource can be eliminated more promptly than the case of collecting manually the information on available resources and making the contract in writing.

Upon receipt of the acceptance of borrowing, the center SB requests the center SX to render the resource, which will be borrowed, execute the deployment of a business application (S205) Following this, the center SX accepts this deployment request (S206) and, then makes this resource execute the deployment of the business application (S207). Finally, the center SX informs the center SB about the completion of the deployment (S208).

In the above process, the center SB sets a network (FW or NAT) in response to the deployment (S207). This setting of the network is performed in order to deploy the business application, as well as to enable the deployed business application to be used on user-terminals.

Referring to FIG. 11, a description will be given below, of the process for searching a proper center. First, the center SB checks all the entries of the management table 24 (S301). This table contains the information on the centers with which the center SB has made the contract at S101. Next, the center SB extracts all the entries, each of which possesses allowable resources of number enough to eliminate the bottleneck pinpointed at S201. Then, the center SB creates the center list 22 (S302).

The center SB accesses to the detail table 26, and it then refers to the detailed information on all the centers that is recorded in the center list 22 (S303). Following this, the center SB excludes, from the center list 22, the centers that do not have available resources (S304). In this case, the available resource represents a resource which is available during a necessary period and meets desired specifications.

The center SB refers to the rental fees of the detail table 26, and it estimates the cost for each center recorded in the center list 22 (S305). The center SB sorts the centers of the center list 22 in ascending or descending order of the location (S306).

Note that when the centers are sorted in ascending order of the location, if there are multiple centers having the same location, then they may be sorted in ascending order of the cost. Alternatively, the centers may be sorted in ascending order of the cost. In this case, if there are centers having the same cost, then they may be sorted in ascending order of the location.

If borrowing the resource with the short location, the center can present the hosting service exhibiting a short delay time. This becomes advantageous for user-terminals in terms of the accessibility. Alternatively, if borrowing the resource at a low cost, the center can acquire a resource at a low cost. This becomes advantageous for the center.

The center SB requests the resource in the center list 22 in the sorted order until the desired resource is acquired (S307). Alternatively, if the cost exceeds a predetermined value, then the center may give up borrowing the resource.

In the above embodiment, a center can borrow one or more resources from another center flexibly under a contract. Accordingly, the center can maintain a hosting business at a desired level. Moreover, by allowing the number of centers that lend the resources to be plural, the chance of borrowing appropriate resources is enhanced. In this embodiment, it has been assumed that the shortage of the resources is kept temporarily. However, if this shortage is estimated to expand over a long period, then the resources may be purchased at S307.

From the aforementioned explanation, those skilled in the art ascertain the essential characteristics of the present invention and can make the various modifications and variations to the present invention to adapt it to various usages and conditions without departing from the spirit and scope of the claims.

To give an example, in the creation of the center list 22 (S302), the necessary resources are borrowed from a single center, in other words, a concentration type is employed. However, alternatively, the necessary resources may be borrowed from multiple centers, in other words, a distributed type may be employed. This enables the resources to be borrowed at a minimum cost.

What is claimed is:

1. A resource management method by a plurality of center apparatuses, said method comprising:
    by a processing unit in each of the center apparatuses, storing, in a memory of the center apparatus that corresponds to the processing unit, resource information on one or more resources which are rental objects in the center apparatus that corresponds to the processing unit;
    by a processing unit in each of the center apparatuses, receiving from each of other center apparatuses among the plurality of center apparatuses, the resource information of the other center apparatuses, and registering the resource information of the other center apparatuses to a management table stored in the memory of the center apparatus that corresponds to the processing unit;
    by a processing unit in a first center apparatus, detecting a computer hardware resource shortage in the first center apparatus, and pinpointing a bottleneck causing the shortage;
    by the processing unit in the first center apparatus, searching through the management table in the memory of the first center apparatus for one or more computer hardware resources which can reduce the bottleneck, and creating a center list of one or more of the center apparatuses which possess the searched one or more computer hardware resources; and
    requesting, by the processing unit in the first center apparatus, to a second center apparatus on the center list, to lend the searched one or more computer hardware resources to reduce the bottleneck;
    after the requesting step, both of the first center apparatus and the second center apparatus processing web requests which were to be processed by the first center apparatus and not the second center apparatus.

2. The resource management method according to claim 1, wherein the resource information of the center apparatuses contains information on rental costs of the searched one or more computer hardware resources,
    wherein creating the center list comprises sorting, in the center list, the one or more of the center apparatuses which possess the searched one or more computer hardware resources in ascending order of the rental cost of their resources, and
    wherein the requesting step comprises requesting the searched one or more computer hardware resources of the one or more of the center apparatuses in the sorted order.

3. The resource management method according to claim 1, wherein creating the center list comprises measuring a communication delay between the first center apparatus and each of the other center apparatuses, and sorting the other center apparatuses in ascending order of the communication delay, and
    wherein the requesting step comprises requesting the searched one or more computer hardware resources of the one or more of the center apparatuses in the sorted order.

4. The resource management method according to claim 1, further comprising sending, to the other center apparatuses, a request of allowing the one or more computer hardware resources, which the first center apparatus will borrow, to execute deployment of an application.

5. The resource management method according to claim 4, wherein requesting the deployment of the application comprises requesting the other center apparatuses and the first center apparatus to set their firewalls.

6. The resource management method according to claim 4, wherein requesting the deployment of the application comprises requesting the other center apparatuses and the first center apparatus to set their NATs.

7. The resource management method according to claim 4, wherein the first center apparatus comprises a business system including a global load balancer, a load balancer, at least one Web server, an AP server and a DB server, and
    wherein requesting the deployment comprises, if the pinpointed bottleneck arises in the Web server:
    requesting the borrowing of the one or more computer hardware resources, each of which includes a load balancer and at least one Web server; and
    requesting connections between the global load balancer and the load balancer of each of the one or more computer hardware resources which the first center apparatus will borrow and between the AP server and the Web server of each of the one or more computer hardware resources which the first center apparatus will borrow.

8. The resource management method according to claim 4, wherein the first center apparatus comprises a business system including a global load balancer, a load balancer, at least one Web server, an AP server and a DB server, and
    wherein requesting the deployment comprises, if the pinpointed bottleneck arises in the AP server:

requesting the borrowing of the one or more computer hardware resources, each of which includes a load balancer, at least one Web server and an AP server; and requesting connections between the global load balancer and the load balancer of each of the one or more computer hardware resources which the first center apparatus will borrow and between the AP server in the first center apparatus and the AP server of each of the one or more computer hardware resources which the first center apparatus will borrow.

9. The resource management method according to claim 4, wherein the first center apparatus comprises a business system including a global load balancer, a load balancer, at least one Web server, an AP server and a DB server, and wherein requesting the deployment comprises, if the pinpointed bottleneck arises in the DB server:

requesting the borrowing of the one or more computer hardware resources, each of which includes a load balancer, at least one Web server, an AP server and a DB server; and requesting connections between the global load balancer and the load balancer of each of the one or more computer hardware resources which the first center apparatus will borrow, and replicating between the DP server of the first center and the DP server of each of the one or more computer hardware resources which the first center apparatus will borrow.

10. A resource management system comprising:

a plurality of center apparatuses; and a plurality of processing units that each correspond to a center apparatus, wherein each of the processing units is configured to perform the following steps:

storing, in a memory of the center apparatus that corresponds to the processing unit, resource information on one or more resources which are rental objects in the center apparatus that corresponds to the processing unit;

receiving from each of the other center apparatuses among the plurality of center apparatuses, the resource information of the other center apparatuses, and registering the resource information of the other center apparatuses to a management table stored in the memory of the center apparatus that corresponds to the processing unit;

by a processing unit corresponding to a first center apparatus, detecting a computer hardware shortage in the first center apparatus, and pinpointing a bottleneck causing the shortage;

by the processing unit corresponding to the first center apparatus, searching through the management table in the memory of the first center apparatus for one or more computer hardware resources which can reduce the bottleneck, and creating a center list of one or more of the center apparatuses which possess the searched one or more computer hardware resources;

requesting, by the processing unit corresponding to the first center apparatus, to a second center apparatus on the center list, to lend the searched one or more computer hardware resources to reduce the bottleneck; and after the requesting step, both of the first center apparatus and the second center apparatus processing web requests which were to be processed by the first center apparatus and not the second center apparatus.

11. The resource management system according to claim 10, wherein the resource information of the other center apparatuses contains information on costs of the searched one or more computer hardware resources, wherein upon creation of the center list, the one or more of the center apparatuses which possess the searched one or more computer hardware resources are sorted in ascending order of the cost of their resources, and wherein the requesting step is requested of the one or more of the other center apparatuses in the sorted order.

12. The resource management system according to claim 10, wherein a communication delay is measured between the first center apparatus and each of the other center apparatuses, wherein upon creation of the center list, the other center apparatuses are sorted in ascending order of communication delay, and wherein the requesting step is requested of the one or more of the other center apparatuses in the sorted order.

* * * * *